(12) United States Patent
Kato

(10) Patent No.: US 10,946,699 B2
(45) Date of Patent: Mar. 16, 2021

(54) TIRE FOR TWO-WHEELED AUTOMOTIVE VEHICLE

(71) Applicant: SUMITOMO RUBBER INDUSTRIES LTD., Kobe (JP)

(72) Inventor: Tomoki Kato, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 193 days.

(21) Appl. No.: 15/933,984

(22) Filed: Mar. 23, 2018

(65) Prior Publication Data

US 2018/0297411 A1 Oct. 18, 2018

(30) Foreign Application Priority Data

Apr. 14, 2017 (JP) .............................. JP2017-080234

(51) Int. Cl.
  *B60C 9/22* (2006.01)
  *B60C 15/00* (2006.01)
  *B60C 9/20* (2006.01)
  *B60C 15/04* (2006.01)
  *B60C 9/04* (2006.01)

(52) U.S. Cl.
  CPC ............... *B60C 9/22* (2013.01); *B60C 9/20* (2013.01); *B60C 15/0036* (2013.01); *B60C 15/0045* (2013.01); *B60C 15/04* (2013.01); *B60C 2009/0425* (2013.01); *B60C 2009/0466* (2013.01); *B60C 2009/2276* (2013.01); *B60C 2200/10* (2013.01)

(58) Field of Classification Search
  CPC ......... B60C 9/20; B60C 9/18; B60C 2200/10; B60C 15/0045
  See application file for complete search history.

(56) References Cited

U.S. PATENT DOCUMENTS

2004/0238094 A1* 12/2004 Kajita ..................... B60C 13/00
  152/454
2011/0308688 A1 12/2011 Bestgen et al.
2015/0321516 A1* 11/2015 Otani .................. B60C 15/0045
  152/541

FOREIGN PATENT DOCUMENTS

| EP | 0 463 875 A2 | 6/1991 | |
| EP | 0463875 A2 * | 1/1992 | .......... B60C 9/2204 |
| JP | 2013-180657 A1 | 9/2013 | |
| JP | 2013180657 A * | 9/2013 | .............. B60C 9/28 |
| JP | 2015-115393 A | 6/2015 | |
| WO | WO 2009/077476 A1 | 6/2009 | |

* cited by examiner

*Primary Examiner* — Robert C Dye
*Assistant Examiner* — Farah Taufiq
(74) *Attorney, Agent, or Firm* — Birch, Stewart, Kolasch & Birch, LLP

(57) ABSTRACT

In a tire 2 for a two-wheeled automotive vehicle, a carcass ply 24 is extended on and between one bead 8 and the other bead 8 along inner sides of a tread 4 and sidewalls 6, and includes a main portion 24a and turn-up portions 24b, which are formed by the carcass ply 24 being turned up around the beads 8 from an inner side toward an outer side in an axial direction. An outer end Pp of each turn-up portion 24b is positioned outward of a tread end Pe in a radial direction. A band 14 is positioned between a belt 12 and the tread 4, such that the band 14 covers the belt 12. An outer end P1 of an inner layer 28 layered over a carcass 10 and the outer end Pp of the turn-up portion 24b are positioned facing each other.

13 Claims, 2 Drawing Sheets

TIRE FOR TWO-WHEELED AUTOMOTIVE VEHICLE

This application claims priority on Patent Application No. 2017-080234 filed in JAPAN on Apr. 14, 2017. The entire contents of this Japanese Patent Application are hereby incorporated by reference.

BACKGROUND OF THE INVENTION

1. Field of the Invention

The present invention relates to pneumatic tires to be mounted to two-wheeled automotive vehicles.

2. Description of the Related Art

In the case of a tire mounted to a two-wheeled automotive vehicle, the ground contacting region of the tread surface during straight running is different from that during cornering. During straight running, the center region of the tread surface contacts with a road surface. During cornering, the shoulder region of the tread surface contacts with the road surface. In this manner, between straight running and cornering, the ground contacting region of the tread surface shifts.

Japanese Laid-Open Patent Application Publication No. 2015-116893 discloses a tire for a two-wheeled automotive vehicle. The tire includes a carcass, a belt, and a band. The belt includes a cord that extends in the circumferential direction in a tilted manner. The band includes a cord that extends in the circumferential direction. The belt and the band are layered over the carcass, and thereby the stiffness of the tread is increased. The tire exhibits high cornering power in cornering. The tire is excellent in terms of stability in cornering.

In the tire, the stiffness of the tread greatly differs between the two sides of a boundary, the boundary being the end of the belt in the axial direction. The stiffness of the tread is reduced in a region between the end of the belt in the axial direction and the tread end. In so-called full-bank cornering, the shoulder region including the tread end contacts with a road surface. When shifting to full-bank cornering, the change in the tread stiffness tends to cause deterioration in the ground contact feeling for the rider. Thus, this tire has room for improvements in terms of transient characteristics when shifting to full-bank cornering.

An object of the present invention is to provide a tire for a two-wheeled automotive vehicle, the tire being excellent in terms of cornering stability and transient characteristics when shifting to full-bank cornering.

SUMMARY OF THE INVENTION

A tire for a two-wheeled automotive vehicle according to the present invention includes: a tread; a pair of sidewalls; a pair of beads; a carcass; a belt; and a band. The carcass includes a carcass ply that is extended on and between one of the beads and the other bead along inner sides of the tread and the sidewalls, the carcass ply including a main portion and turn-up portions that are formed by the carcass ply being turned up around the beads from an inner side toward an outer side in an axial direction. The belt includes a first layer layered over the carcass. The band is positioned between the belt and the tread, such that the band covers the belt. An outer end of each turn-up portion in a radial direction is positioned outward of a tread end in the radial direction. An outer end of the first layer in the axial direction and the outer end of the turn-up portion in the radial direction are positioned facing each other. A distance L1 between the outer end of the first layer in the axial direction and the outer end of the turn-up portion in the radial direction is not greater than 15 mm.

Preferably, the distance L1 is not less than 2 mm.

Preferably, the belt includes a second layer layered outward of the first layer in the radial direction, and the second layer covers the outer end of the first layer in the axial direction and the outer end of the turn-up portion in the radial direction.

Preferably, a distance L2, over which the second layer covers the turn-up portion, is not less than 5 mm.

Preferably, a ratio of a width W1 of the first layer to a tread width Wt of the tread is not less than 0.85 and not greater than 0.95.

In the tire for a two-wheeled automotive vehicle according to the present invention, the outer end of the first layer in the axial direction and the outer end of the turn-up portion in the radial direction are positioned facing each other. The distance L1 between the outer end of the first layer in the axial direction and the outer end of the turn-up portion in the radial direction is not greater than 15 mm. According to this structure, a great difference in tread stiffness between the two sides of a boundary is suppressed from occurring, the boundary being the outer end of the first layer in the axial direction. The tire is excellent in terms of transient characteristics when shifting to full-bank cornering while maintaining cornering stability.

DESCRIPTION OF THE PREFERRED EMBODIMENTS

The following will describe in detail the present invention based on preferred embodiments with reference, where appropriate, to the accompanying drawings.

Figure 1:
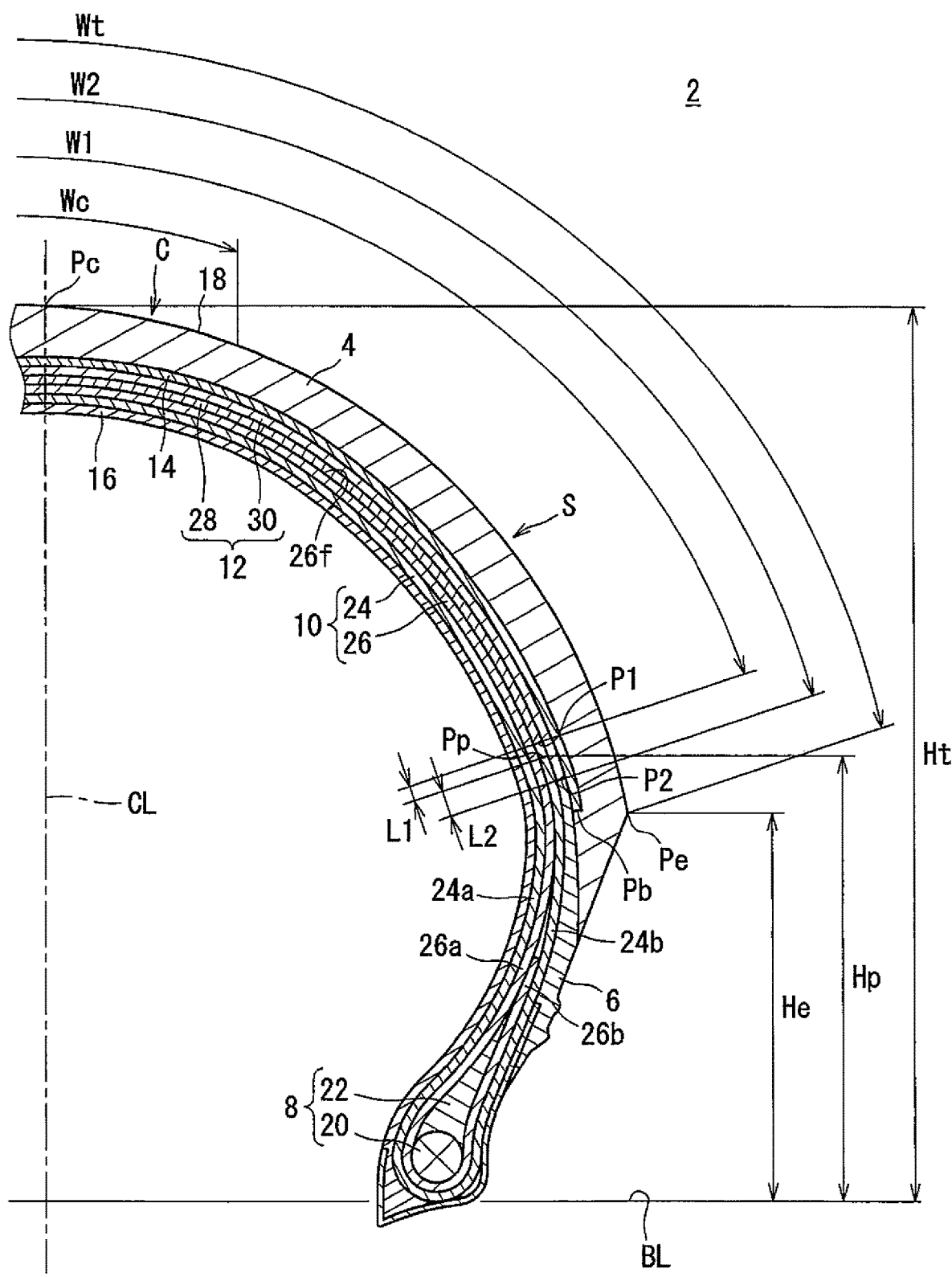
FIG. 1 is a sectional view showing part of a pneumatic tire according to one embodiment of the present invention.

FIG. 1 shows a cross section of a pneumatic tire 2. In FIG. 1, the up-down direction represents the radial direction of the tire 2; the right-left direction represents the axial direction of the tire 2; and the direction perpendicular to the plane of the drawing is the circumferential direction of the tire 2. In FIG. 1, a one-dot chain line CL represents the equator plane of the tire 2, and a straight line BL represents a bead base line. The bead base line is a line that defines the rim diameter of a normal rim on which the tire 2 is mounted. The shape of the tire 2, except its tread pattern, is symmetrical with respect to the equator plane.

The tire 2 includes a tread 4, a pair of sidewalls 6, a pair of beads 8, a carcass 10, a belt 12, a band 14, and an inner liner 16. The tire 2 is of a tubeless type. The tire 2 is mounted to the front wheel of a two-wheeled automotive vehicle.

The tread 4 has a shape that projects outward in the radial direction. The tread 4 has a tread surface 18, which comes into contact with a road surface. Although not illustrated, grooves are formed in the tread surface 18. These grooves form a tread pattern. The grooves need not be formed in the tread surface 18. The tread 4 is made of a crosslinked rubber having excellent wear resistance, thermal resistance, and grip performance.

Each of the sidewalls 6 extends substantially inward from the end of the tread 4 in the radial direction. Each sidewall 6 is made of a crosslinked rubber having excellent cut resistance and weather resistance. The sidewalls 6 prevent damage to the carcass 10. The sidewalls 6 absorb impact from the road surface by deflecting.

The beads 8 are positioned substantially inward of the sidewalls 6, respectively, in the axial direction. Each of the beads 8 includes: a core 20; and an apex 22 extending outward from the core 20 in the radial direction. The core 20 includes a non-stretchable wire wound in the circumferential direction. Typically, the wire is made of steel. The apex 22 is tapered outward in the radial direction. The apex 22 is made of a crosslinked rubber with high hardness.

In the tire 2, the core 20 is formed by winding a single wire. The core 20 has a helical structure formed by the single wire extending substantially in the circumferential direction. Alternatively, the core 20 may be formed by winding two or more wires. The core 20 may have a cable bead structure. In the cable bead structure, the core 20 includes a core wire having a round cross section and a wire helically wound around the core wire.

The carcass 10 includes: a first ply 24 as a carcass ply of the present invention; and a second ply 26 layered over the first ply 24. The first ply 24 and the second ply 26 are extended on and between the beads 8 on both sides. The first ply 24 and the second ply 26 extend along the tread 4 and the sidewalls 6. The first ply 24 is tuned up around the core 20 from the inner side toward the outer side in the axial direction. The first ply 24 includes a main portion 24a and turn-up portions 24b, which are formed by the first ply 24 being turned up in this manner. The second ply 26 is turned up around the core 20 from the inner side toward the outer side in the axial direction. The second ply 26 includes a main portion 26a and turn-up portions 26b, which are formed by the second ply 26 being turned up in this manner. The main portion 26a is layered outward of the main portion 24a. The turn-up portions 24b and the turn-up portions 26b extend outward in the radial direction. The end of each turn-up portion 24b is positioned outward of the end of each turn-up portion 26b in the radial direction. An outer surface 26f of the main portion 26a of the second ply 26 forms the outer peripheral surface of the carcass 10 between the pair of turn-up portions 24b in the axial direction.

Although not illustrated, each of the first ply 24 and the second ply 26 includes a large number of cords aligned with each other and topping rubber. The absolute value of an angle each cord forms with the equator plane is 75° to 90°. The second ply 26 includes a large number of cords aligned with each other and topping rubber. The absolute value of an angle each cord forms with the equator plane is 75° to 90°. In other words, the carcass 10 forms a radial structure. Each cord is made of an organic fiber. Preferable examples of the organic fiber include polyester fibers, nylon fibers, rayon fibers, polyethylene naphthalate fibers, and aramid fibers. The carcass 10 may be formed by one ply that is the first ply 24.

The belt 12 is positioned inward of the tread 4 in the radial direction. The belt 12 is layered over the carcass 10. The belt 12 reinforces the carcass 10. The belt 12 includes an inner layer 28 as a first layer and an outer layer 30 as a second layer. The inner layer 28 is layered over the outer surface 26f which serves as the outer peripheral surface of the carcass 10. It is clear from FIG. 1 that, in the axial direction, the width of the inner layer 28 is slightly less than the width of the outer layer 30. Although not illustrated, each of the inner layer 28 and the outer layer 30 includes a large number of cords aligned with each other and topping rubber. Each cord is tilted relative to the equator plane. The absolute value of the tilt angle is generally not less than 10° and not greater than 35°. The direction in which each cord of the inner layer 28 is tilted relative to the equator plane is opposite to the direction in which each cord of the outer layer 30 is tilted relative to the equator plane. Preferably, these cords are made of steel. An organic fiber such as a rayon fiber may be used for each cord. The belt 12 may include three or more layers.

The band 14 is positioned outward of the belt 12 in the radial direction. In the axial direction, the width of the band 14 is greater than the width of the belt 12. Although not illustrated, the band 14 includes a cord and topping rubber. The cord is helically wound. The band 14 has a so-called joint-less structure. The cord extends substantially in the circumferential direction. The angle of the cord relative to the circumferential direction is not greater than 5°, and more preferably, not greater than 2°. Since the belt 12 is held by the cord, lifting of the belt 12 is suppressed. The cord is made of an organic fiber. Preferable examples of the organic fiber include nylon fibers, polyester fibers, rayon fibers, polyethylene naphthalate fibers, and aramid fibers.

The inner liner 16 is positioned inward of the carcass 10. The inner liner 16 is joined to the inner surface of the carcass 10. The inner liner 16 is made of a crosslinked rubber. The rubber used for the inner liner 16 is excellent in terms of airtightness. A typical base rubber of the inner liner 16 is isobutylene-isoprene-rubber or halogenated isobutylene-isoprene-rubber. The inner liner 16 keeps the internal pressure of the tire 2.

In FIG. 1, reference sign Pe represents a tread end. In the axial direction, the tread end Pe is the outer end of the tread surface 18, which comes into contact with the road surface. Reference sign P1 represents the outer end of the inner layer 28 in the axial direction. Reference sign P2 represents the outer end of the outer layer 30 in the axial direction. Reference sign Pb represents the outer end of the band 14 in the axial direction. Reference sign Pp represents the outer end of the turn-up portion 24b in the radial direction. Reference sign Pc represents the point of intersection of the tread surface 18 and the equator plane.

In FIG. 1, a single-headed arrow Wt represents a tread width. The tread width Wt is the distance from one tread end Pe to the other tread end Pe. The tread width Wt is measured along the tread surface 18. A single-headed arrow W1 represents the width of the inner layer 28. In the axial direction, the inner layer 28 extends from one outer end P1 to the other outer end P1. The width W1 is the distance from the one outer end P1 to the other outer end P1. The width W1 is measured along the outer peripheral surface of the inner layer 28. A single-headed arrow W2 represents the width of the outer layer 30. In the axial direction, the outer layer 30 extends from one outer end P2 to the other outer end P2. The width W2 is the distance from the one outer end P2 to the other outer end P2. The width W2 is measured along the outer peripheral surface of the outer layer 30.

In FIG. 1, a double-headed arrow Ht represents a tire height. The tire height Ht is the distance from the bead base line to the point of intersection Pc. A double-headed arrow He represents a tread end height. The tread end height He is the distance from the bead base line to the tread end Pe. A double-headed arrow Hp represents a turn-up height of the turn-up portion 24b. The turn-up height Hp is the distance from the bead base line to the outer end Pp. The tire height Ht, the tread end height He, and the turn-up height Hp are each measured as a distance in a straight line in the radial direction.

The tread surface 18 includes a center region C and a pair of shoulder regions S. The center region C is positioned at the center of the tread surface 18 in the axial direction. The pair of shoulder regions S is positioned outward of the center region C in the axial direction. A single-headed arrow We represents a center width of the center region C. The center width We is measured along the tread surface 18. In general, the ratio of the center width Wc to the tread width Wt (Wc/Wt) is not less than 0.2 and not greater than 0.4.

In the tire 2, the inner layer 28 of the belt 12 is layered over the outer surface 26f of the second ply 26, the outer surface 26f serving as the outer peripheral surface of the carcass 10. The turn-up portion 24b of the first ply 24 is, at its outer end Pp, layered over the outer surface 26f. The inner layer 28 extends between the pair of outer ends P1 in a direction along the outer surface 26f. The outer end P1 of the inner layer 28 and the outer end Pp of the turn-up portion 24b are positioned facing each other in the direction along the outer surface 26f which serves as the outer surface of the carcass 10.

Figure 2:
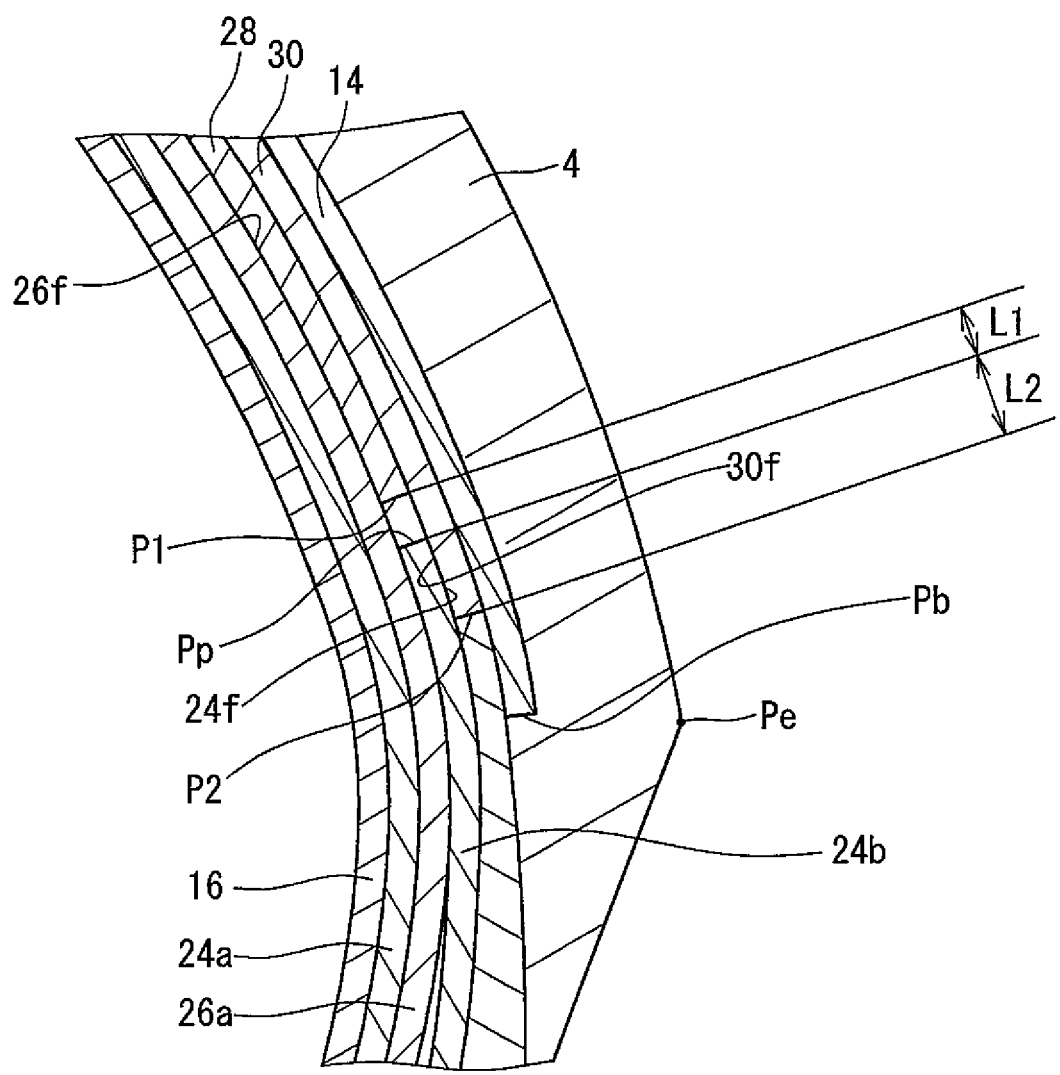
FIG. 2 is an enlarged sectional view showing part of FIG. 1.

In FIG. 2, a double-headed arrow L1 represents a distance between the outer end Pp of the turn-up portion 24b and the outer end P1 of the inner layer 28. The distance L1 is measured along the outer surface 26f of the second ply 26 in the cross section of FIG. 1. A double-headed arrow L2 represents a distance over which the outer layer 30 covers the turn-up portion 24b. The distance L2 represents a length over which an outer surface 24f of the turn-up portion 24b and an inner surface 30f of the outer layer 30 overlap each other. The distance L2 is measured along the outer surface 24f of the turn-up portion 24b in the cross section of FIG. 1.

In cornering of a two-wheeled automotive vehicle, the rider tilts the two-wheeled automotive vehicle inward. By the tilting, the cornering of the two-wheeled automotive vehicle is achieved. The tread surface 18 of the tire 2 has a small curvature radius so as to facilitate the tilting of the two-wheeled automotive vehicle. The curvature radius of the tread surface 18 is less than the curvature radius of the tread surface for a four-wheeled automotive vehicle. The curvature radius of the tire 2 mounted to a two-wheeled automotive vehicle is generally not less than 50 mm and not greater than 150 mm. On the other hand, in the case of a tire mounted to a four-wheeled automotive vehicle, its curvature radius R on the equator plane is generally not less than 500 mm and not greater than 1000 mm.

In straight running, the center region C of the tread surface 18 of the tire 2 mainly contacts with the road surface. In cornering, the shoulder region S of the tread surface 18 contacts with the road surface. There are different types of cornering, i.e., so-called middle-bank cornering, in which the rider tilts the two-wheeled automotive vehicle at a shallow angle, and so-called full-bank cornering, in which the rider tilts the two-wheeled automotive vehicle at a deep angle. In the middle-bank cornering, part of the shoulder region S, the part being positioned inward of the tread end Pe in the axial direction, contacts with the road surface. In the full-bank cornering, part of the shoulder region S, the part including the tread end Pe, contacts with the road surface. Between straight running and cornering, the ground contacting region of the tread surface 18 of the tire 2, the ground contacting region contacting with the road surface, shifts. Also between middle-bank cornering and full-bank cornering, the ground contacting region of the tread surface 18 shifts.

In the tire 2, the carcass 10 is tightened by the inner layer 28. In addition, the inner layer 28 is held by the band 14. In this manner, the stiffness of the tread 4 is increased in the shoulder region S. The tire 2 exhibits high cornering power. The tire 2 contributes to improvement in the cornering performance of a two-wheeled automotive vehicle.

The outer end Pp of the turn-up portion 24b is positioned outward of the tread end Pe in the radial direction. The inner layer 28 is positioned between the pair of outer ends Pp. The outer end P1 of the inner layer 28 and the outer end Pp face each other. The distance L1 between the outer end P1 and the outer end Pp is small. According to this structure, a great difference in the stiffness of the tread 4 between the two sides of a boundary is suppressed from occurring, the boundary being the outer end P1 of the inner layer 28. At a time when the tire 2 shifts to full-bank cornering, in which the tread end Pe contacts with the road surface, rapid change in the ground contact feeling of the tire 2 is suppressed from occurring. Thus, the tire 2 is excellent in terms of transient characteristics when shifting between middle-bank cornering and full-bank cornering.

In the tire 2, a great difference in the stiffness of the tread 4 between the two sides of the boundary is suppressed from occurring, the boundary being the outer end P1 of the inner layer 28. In this viewpoint, the distance L1 between the outer end P1 of the inner layer 28 and the outer end Pp of the turn-up portion 24b is set to be not greater than 15 mm. In this viewpoint, the distance L1 is preferably not greater than 10 mm, and more preferably not greater than 8 mm.

Meanwhile, when the tire 2 deflects, the outer end P1 of the inner layer 28 and the outer end Pp of the turn-up portion 24b move in different directions from each other. If the distance L1 is too small damage tends to occur due to the movements of the outer end P1 and the outer end Pp in different directions from each other. From the viewpoint of suppressing the damage, the distance L1 is preferably not less than 2 mm, more preferably not less than 3 mm, and particularly preferably not less than 4 mm.

When the tire 2 deflects, compression stress is exerted on components at the inner liner 16 side, and tensile stress is exerted on components at the tread surface 18 side. The boundary between a portion on which the compression stress is exerted and a portion on which the tensile stress is exerted is positioned on the main portion 24a or 26a of the carcass 10. The tensile stress is exerted on a portion where the outer end P1 of the inner layer 28 and the outer end Pp of the turn-up portion 24b are positioned. In the tire 2, the outer layer 30 covers the outer end P1 of the inner layer 28 and the outer end Pp of the turn-up portion 24b. The outer layer 30 suppresses extension and deformation between the outer end P1 and the outer end Pp. The outer layer 30 improves the stiffness of the tread 4 between the outer end P1 and the outer end Pp.

From the viewpoint of improving the stiffness, the distance L2, over which the outer layer 30 covers the turn-up portion 24b, is preferably not less than 5 mm, and more preferably not less than 6 mm. However, if the distance L2 is increased to a certain degree or more, no further stiffness-improving effect will be expected. On the contrary, increasing the distance L2 more than necessary will result in increase in the mass of the tire 2. From these viewpoints, the distance L2 is preferably not greater than 10 mm, and more preferably not greater than 9 mm.

Moreover, by covering the outer end P1 and the outer end Pp, the outer layer 30 suppresses the movements of the outer end P1 and the outer end Pp in different directions from each other. The outer layer 30 makes it possible to suppress damage from occurring due to the movements of the outer end P1 and the outer end Pp in different directions from each other.

Since the inner layer 28 is positioned inward of the tread surface 18, which comes into contact with the road surface, the tread 4 exhibits high stiffness. Accordingly, in cornering, the tire 2 exhibits high cornering power. In full-bank cornering, preferably, the inner layer 28 extends inward of part of the tread surface 18, the part being in contact with the road surface. While the tread surface 18 is in contact with the road surface, high cornering power is obtained if the inner layer 28 extends inward of the center of the ground contacting region in the axial direction. In this viewpoint, the ratio of the width W1 of the inner layer to the tread width Wt (W1/Wt) is preferably not less than 0.85, and more preferably not less than 0.86.

When the tire 2 deflects due to a load thereon, the sidewall 6 deforms greatly. The deformation of the sidewall 6 is greater than that of the tread 4. In the tire 2, the outer end P1 of the inner layer 28 and the outer end Pp of the turn-up portion 24b are positioned outward of the tread end Pe in the radial direction. Accordingly, the occurrence of great deformation is suppressed around the outer end P1 and the outer end Pp. Thus, the tire 2 has improved durability. In this viewpoint, the ratio (W1/Wt) is preferably not greater than 0.95, and more preferably not greater than 0.94. Moreover, since the outer end P2 of the outer layer 30 is positioned outward of the tread end Pe in the radial direction, the occurrence of great deformation is suppressed around the outer end P2. Also from the viewpoint of positioning the outer end P2 outward of the tread end Pe in the radial direction, the ratio (W1/Wt) is preferably not greater than 0.95.

In the present invention, the dimensions and angles of the tire 2 and the components of the tire 2 are measured on the cross section shown in FIG. 1. During the measurement, no load is applied to the tire 2. In the description herein, the term "normal rim" means a rim that is specified according to the standard with which the tire 2 complies. The "standard rim" in the JATMA standard, the "Design Rim" in the TRA standard, and the "Measuring Rim" in the ETRTO standard are normal rims. In the description herein, the term "normal internal pressure" means an internal pressure that is specified according to the standard with which the tire 2 complies. The "maximum air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard are normal internal pressures. In the description herein, the term "normal load" means a load that is specified according to the standard with which the tire 2 complies. The "maximum load capacity" in the JATMA standard, the "maximum value" recited in "TIRE LOAD LIMITS AT VARIOUS COLD INFLATION PRESSURES" in the TRA standard, and the "LOAD CAPACITY" in the ETRTO standard are normal loads.

EXAMPLES

Hereinafter, advantageous effects of the present invention will become apparent according to examples. However, the present invention should not be restrictively construed based on the description of the examples.

Example 1

A tire having the structure shown in FIG. 1 was obtained. The size of the tire was 120/80R420. The specifications of the tire are indicated in Table 1 below. In Table 1, for the item of "Position of inner layer", "Y" indicates that the inner layer of the belt is positioned between the outer ends of the turn-up portions of the first ply as shown in FIG. 1. For the item of "Position of outer end of turn-up portion", "Outward" indicates that the outer end of each turn-up portion is positioned outward of the tread end in the radial direction. For the item of "Position of outer end of turn-up portion", "Inward" indicates that the outer end of the turn-up portion is positioned inward of the tread end in the radial direction. For the item of "Overlap", "Present" indicates that the outer layer of the belt and the outer end of the turn-up portion of the first ply overlap each other.

Comparative Example 1

A tire of Comparative Example 1 is a conventional tire. In the tire, the outer end of the turn-up portion of the first ply was positioned inward of the tread end in the radial direction. The ratio (W1/Wt) was 0.80. The outer layer was absent in the tire. Except for the items indicated in Table 1, the tire of Comparative Example 1 was the same as the tire of Example 1.

Examples 2 to 4

A tire was obtained in the same manner as in Example 1 except that the distance L1, the ratio (W1/Wt), the presence or absence of the outer layer, the overlap of the outer layer and the turn-up portion, and the distance L2 were changed as shown in Table 1.

Examples 5 to 7

A tire was obtained in the same manner as in Example 1 except that the distance L1 was changed as shown in Table 2.

Examples 8 and 9

A tire was obtained in the same manner as in Example 1 except that the distance L2 was changed as shown in Table 2.

[Maneuverability]

These test tires were each mounted to the front wheel of a 1000 cc two-wheeled automotive vehicle with a four-stroke engine. The internal pressure of the tire was set to a normal internal pressure. A commercially available tire was mounted to the rear wheel, and the internal pressure of the tire was set to a normal internal pressure. In a circuit course, a rider rode the two-wheeled automotive vehicle on an asphalt road surface, and made sensory evaluation. Evaluation items were straight running stability, cornering stability, and full-bank cornering stability. The evaluation was made for each evaluation item on a scale of 1 to 10. The evaluation results are shown in Tables 1 and 2 below. For each evaluation item, 5 was set as a standard value for evaluation. The higher the evaluation value, the more favorable the evaluation was.

[Durability]

In compliance with the ECE 75 and by use of a drum tester, under the condition of a standard tire load of 88% of the maximum tire load, the speed of each tire was gradually increased for 20 minutes from 0 km/h to the maximum speed minus 40 km/h, the maximum speed being indicated by the speed rating of the tire. Thereafter, the speed was increased by 10 km/h every ten minutes from the maximum speed minus 40 km/h. When damage occurred to the tire, the speed at the time (i.e., destruction speed) and the running time at the speed were measured. The measurement result in each Example was evaluated by using the measurement result in Comparative Example 1 as an index of 100. Each evaluation result is shown as a numerical value in Table 1 or 2 below. The higher the numerical value, the more favorable the evaluation was.

TABLE 1

Evaluation Results

|  | Comparative Example 1 | Example 1 | Example 2 | Example 3 | Example 4 |
|---|---|---|---|---|---|
| Position of inner layer | — | Y | Y | Y | Y |
| Position of outer end of turn-up portion | Inward | Outward | Outward | Outward | Outward |
| Distance L1 (mm) | — | 10 | 10 | 15 | 15 |
| Ratio (W1/Wt) | 0.80 | 0.85 | 0.85 | 0.80 | 0.80 |
| Outer layer | Absent | Present | Present | Present | Absent |
| Overlap | — | Present | Absent | Absent | — |
| Distance L2 (mm) | — | 5 | — | — | — |
| Straight running | 8 | 8 | 8 | 8 | 8 |
| Cornering | 8 | 8 | 8 | 8 | 8 |
| Full-bank cornering | 4 | 9 | 8 | 7 | 6 |
| Durability | 100 | 120 | 115 | 112 | 110 |

TABLE 2

Evaluation Results

|  | Example 5 | Example 6 | Example 7 | Example 8 | Example 9 |
|---|---|---|---|---|---|
| Position of inner layer | Y | Y | Y | Y | Y |
| Position of outer end of turn-up portion | Outward | Outward | Outward | Outward | Outward |
| Distance L1 (mm) | 2 | 5 | 15 | 10 | 10 |
| Ratio (W1/Wt) | 0.93 | 0.90 | 0.80 | 0.85 | 0.85 |
| Outer layer | Present | Present | Present | Present | Present |
| Overlap | Present | Present | Present | Present | Present |
| Distance L2 (mm) | 5 | 5 | 5 | 3 | 10 |
| Straight running | 8 | 8 | 8 | 8 | 8 |
| Cornering | 8 | 8 | 8 | 8 | 8 |
| Full-bank cornering | 9 | 9 | 8 | 8 | 9 |
| Durability | 105 | 120 | 120 | 117 | 120 |

As shown in Tables 1 and 2, the evaluation of the tire of each Example is higher than the evaluation of the tire of Comparative Example. It is clear from these evaluation results that the present invention is superior.

The tire described above is applicable to various two-wheeled automotive vehicles. The above description has been given by taking, as one example, a front tire that is mounted to the front wheel of a two-wheeled automotive vehicle. However, the present invention is similarly applicable to a rear tire that is mounted to the rear wheel.

The foregoing description is in all aspects illustrative, and various modifications can be devised without departing from the essential features of the invention.

What is claimed is:

1. A tire for a two-wheeled automotive vehicle, comprising:
   a tread;
   a pair of sidewalls;
   a pair of beads;
   a carcass;
   a belt; and
   a band,
   wherein
   the carcass includes a first carcass ply that extends between the pair of beads along inner sides of the tread and the sidewalls,
   the first carcass ply includes a main portion and turn-up portions that are formed by the first carcass ply being turned up around the beads from an inner side toward an outer side in an axial direction,
   the belt includes a belt first layer layered over the carcass,
   the belt first layer includes a large number of cords that are each tilted relative to the tire equatorial plane wherein each cord of the belt first layer has a tilt angle that is not less than 10° and not greater than 35°,
   the band is positioned between the belt and the tread, such that the band covers the belt,
   each outer end of each turn-up portion in a radial direction is positioned outward of each tread end in the radial direction,
   each outer end face of the belt first layer in the axial direction and each corresponding outer end face of the first carcass ply turn-up portions in the radial direction are spaced apart from and face each other in a direction along a circumferential surface of the carcass, and
   a distance L1 between each outer end face of the belt first layer in the axial direction and each outer end face of the first carcass ply turn-up portions in the radial direction is not greater than 15 mm.

2. The tire for a two-wheeled automotive vehicle according to claim 1, wherein the distance L1 is not less than 2 mm.

3. The tire for a two-wheeled automotive vehicle according to claim 1, wherein the belt includes a second layer layered outward of the belt first layer in the radial direction, and the belt second layer covers each outer end of the belt first layer in the axial direction and each outer end of the first carcass ply turn-up portions in the radial direction.

4. The tire for a two-wheeled automotive vehicle according to claim 2, wherein the belt includes a second layer layered outward of the belt first layer in the radial direction, and the belt second layer covers each outer end of the belt first layer in the axial direction and each outer end of the first carcass ply turn-up portions in the radial direction.

5. The tire for a two-wheeled automotive vehicle according to claim 3, wherein a distance L2, over which the belt second layer covers each of the first carcass ply turn-up portions, is not less than 5 mm.

6. The tire for a two-wheeled automotive vehicle according to claim 4, wherein a distance L2, over which the belt second layer covers each of the first carcass ply turn-up portions, is not less than 5 mm.

7. The tire for a two-wheeled automotive vehicle according to claim 1, wherein a ratio of a width W1 of the belt first layer to a tread width Wt of the tread is not less than 0.85 and not greater than 0.95.

8. The tire for a two-wheeled automotive vehicle according to claim 2, wherein a ratio of a width W1 of the belt first layer to a tread width Wt of the tread is not less than 0.85 and not greater than 0.95.

9. The tire for a two-wheeled automotive vehicle according to claim 3, wherein a ratio of a width W1 of the belt first layer to a tread width Wt of the tread is not less than 0.85 and not greater than 0.95.

10. The tire for a two-wheeled automotive vehicle according to claim 4, wherein a ratio of a width W1 of the belt first layer to a tread width Wt of the tread is not less than 0.85 and not greater than 0.95.

11. The tire for a two-wheeled automotive vehicle according to claim 5, wherein a ratio of a width W1 of the belt first layer to a tread width Wt of the tread is not less than 0.85 and not greater than 0.95.

12. The tire for a two-wheeled automotive vehicle according to claim 6, wherein a ratio of a width W1 of the belt first layer to a tread width Wt of the tread is not less than 0.85 and not greater than 0.95.

13. The tire for a two-wheeled automotive vehicle according to claim 1, wherein the carcass further comprises a second carcass ply having a second carcass ply main portion layered outward of the first carcass ply main portion in the radial direction, and turn-up portions formed by the second carcass ply being turned up around the beads from an inner side toward an outer side in an axial direction such that each second carcass ply turn-up portion is layered inward of each first carcass ply turn-up portion in the axial direction.

* * * * *